Figure 5:
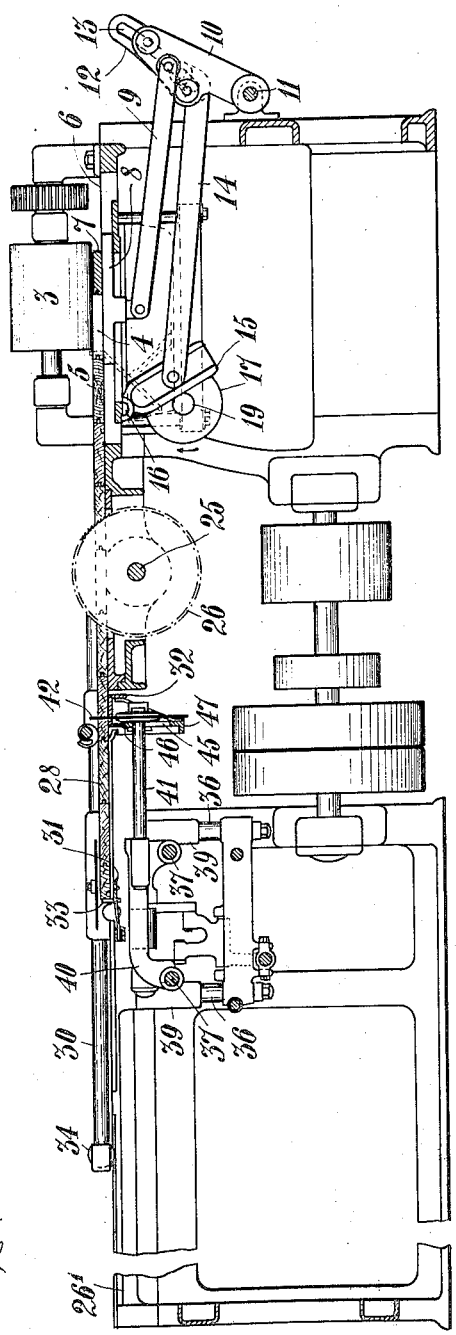

A. A. WESTMAN.
MACHINE FOR MANUFACTURING PLATES OF BOARDS.
APPLICATION FILED NOV. 30, 1910.
1,057,471.
Patented Apr. 1, 191
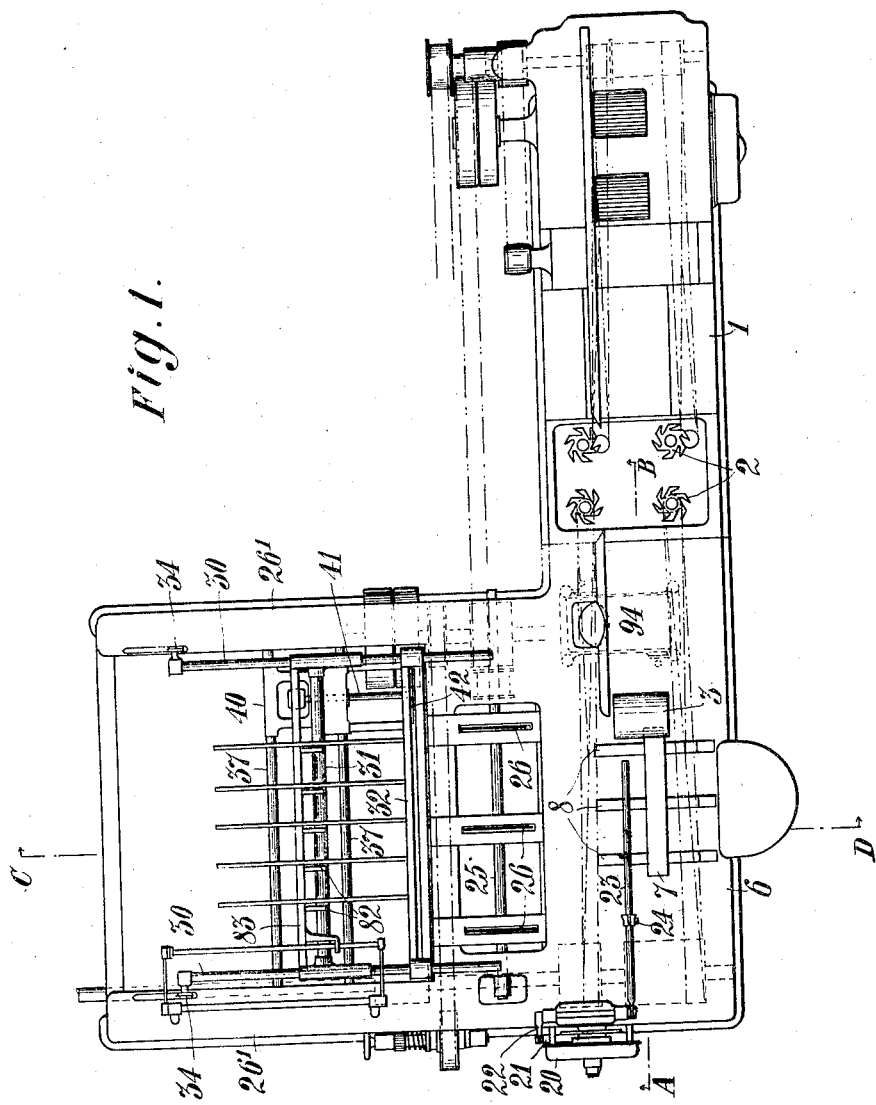

A. A. WESTMAN.
MACHINE FOR MANUFACTURING PLATES OF BOARDS.
APPLICATION FILED NOV. 30, 1910.
1,057,471.
Patented Apr. 1, 1913.
9 SHEETS—SHEET 2.
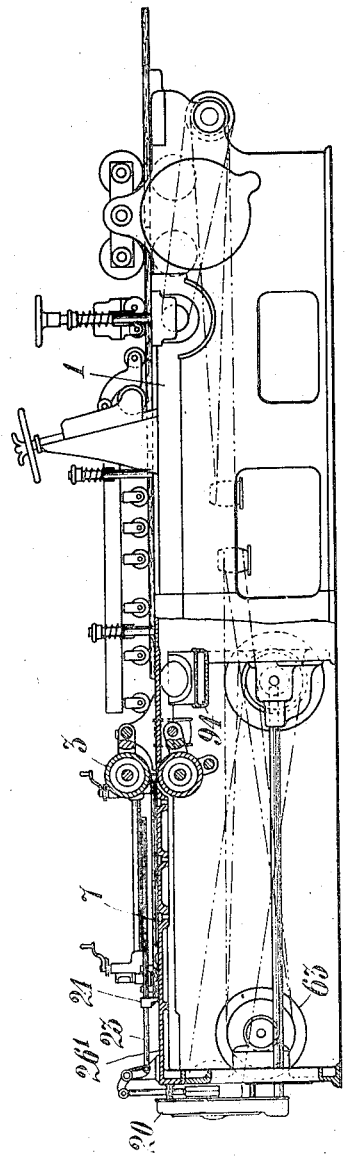

A. A. WESTMAN.
MACHINE FOR MANUFACTURING PLATES OF BOARDS.
APPLICATION FILED NOV. 30, 1910.

1,057,471.

Patented Apr. 1, 1913.
9 SHEETS—SHEET 3.

C-D.

Witnesses
C. Hyman
M. Schmid

Inventor
Anders August
Westman
by B. Singer atty

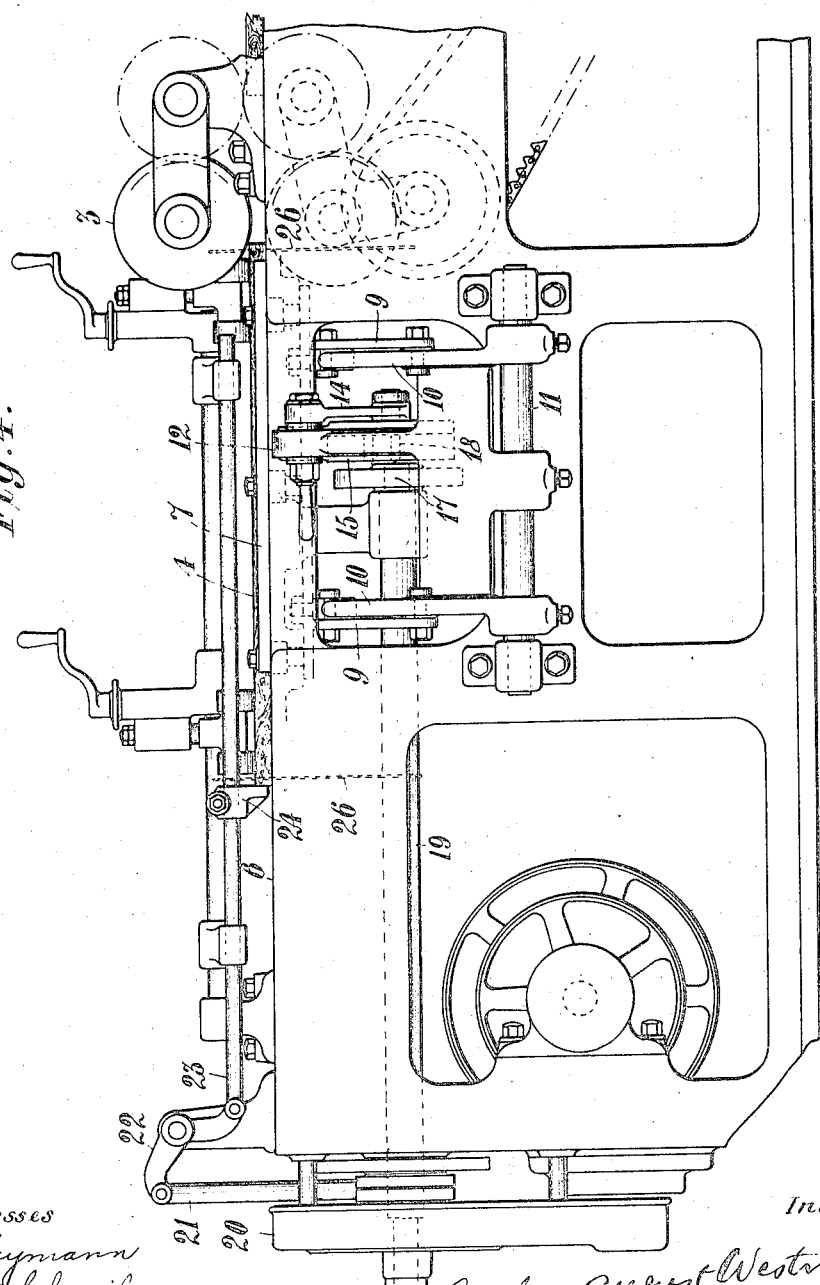

A. A. WESTMAN.
MACHINE FOR MANUFACTURING PLATES OF BOARDS.
APPLICATION FILED NOV. 30, 1910.

1,057,471.

Patented Apr. 1, 1913.
9 SHEETS—SHEET 5.

Witnesses
C. Hymann
M. Schmid

Inventor
Anders August Westman
by B. Singer atty

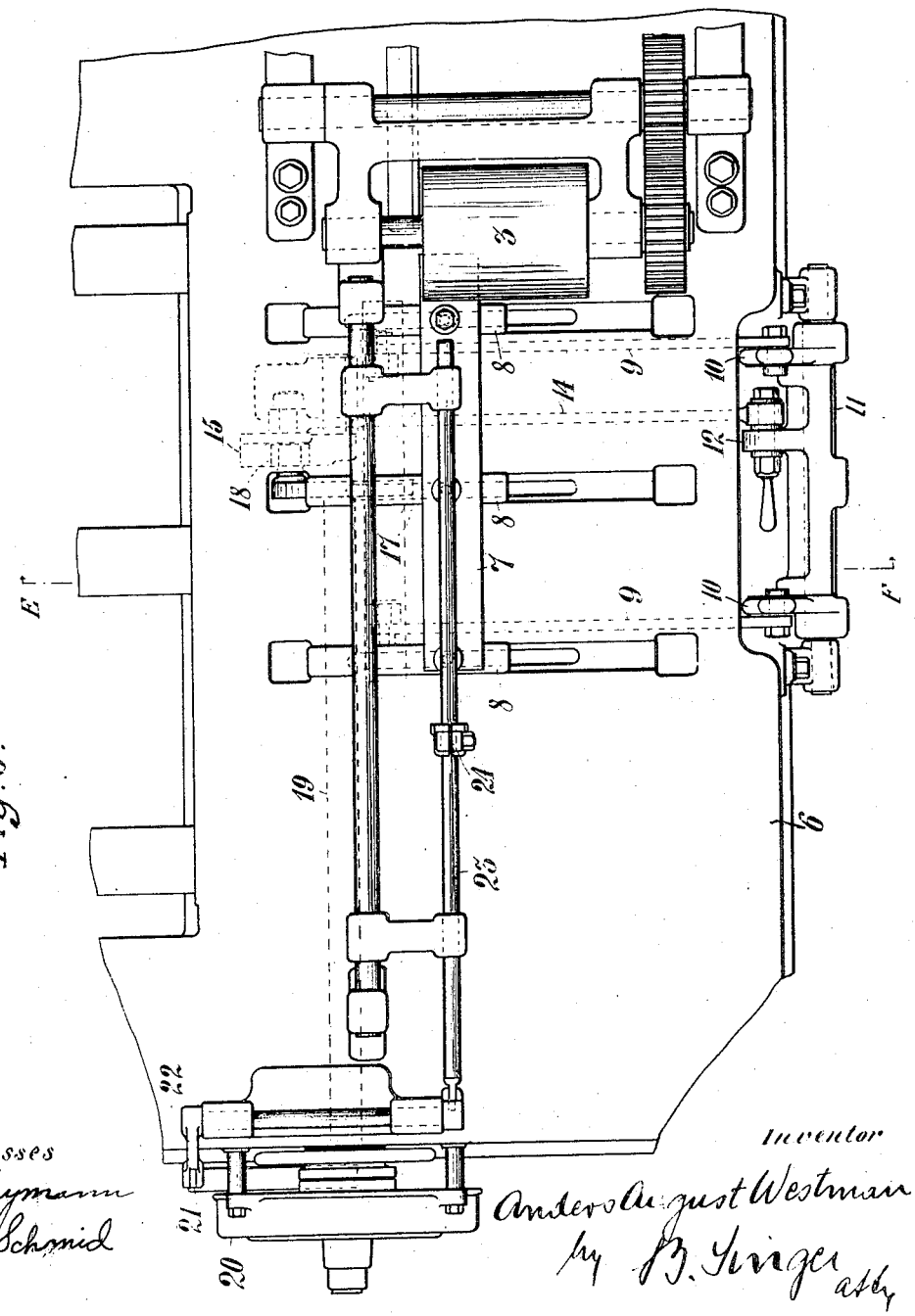

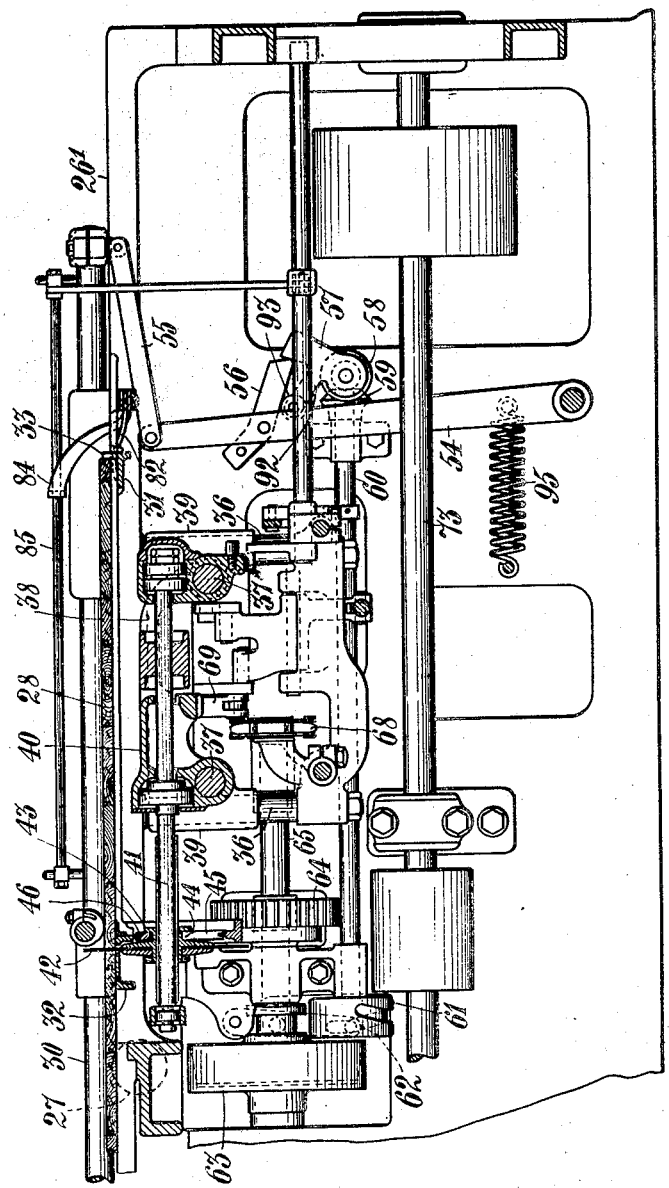

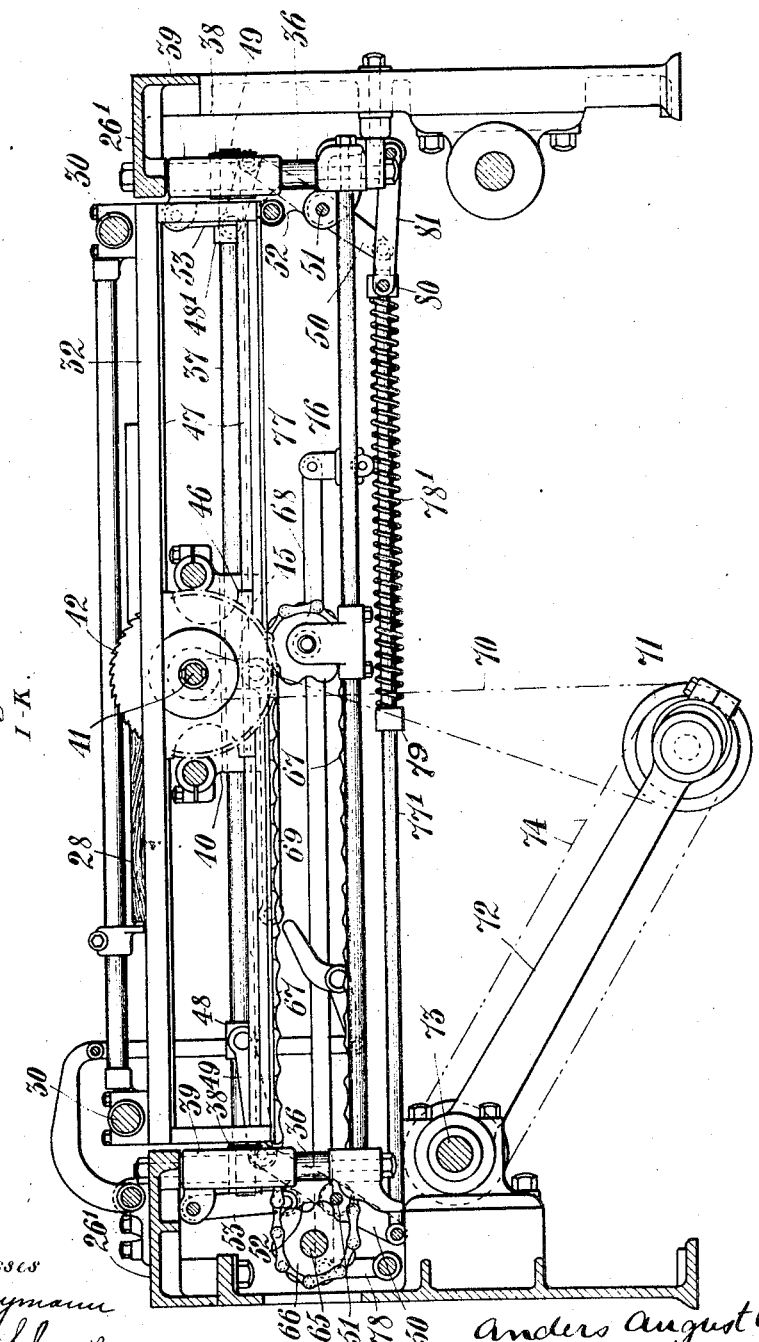

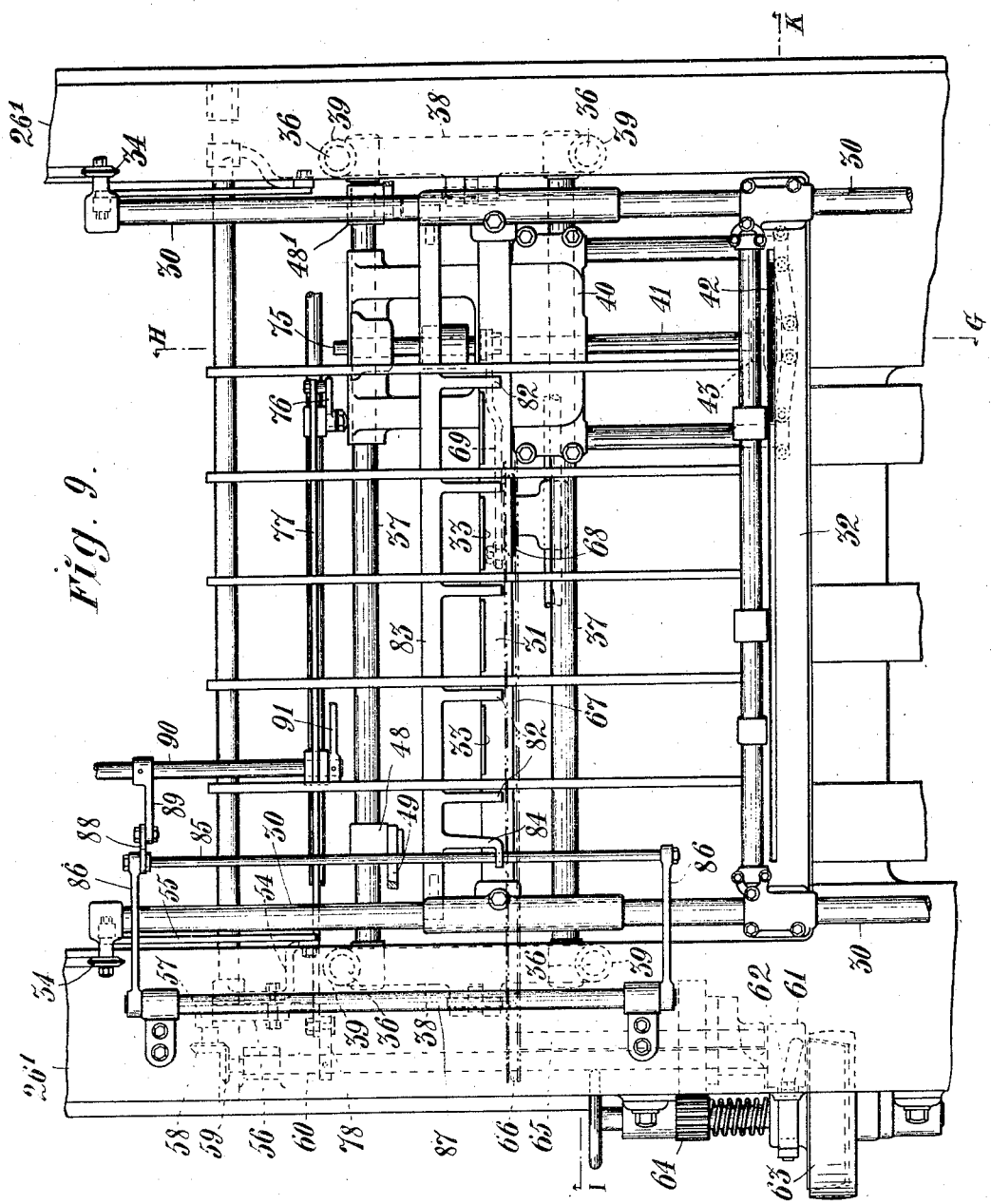

UNITED STATES PATENT OFFICE.

ANDERS AUGUST WESTMAN, OF STOCKHOLM, SWEDEN, ASSIGNOR TO J. & C. G. BOLINDERS MEKANISKA VERKSTADS AKTIEBOLAG, OF STOCKHOLM, SWEDEN.

MACHINE FOR MANUFACTURING PLATES OF BOARDS.

1,057,471. Specification of Letters Patent. Patented Apr. 1, 1913.

Application filed November 30, 1910. Serial No. 594,983.

*To all whom it may concern:*

Be it known that I, ANDERS AUGUST WESTMAN, a subject of the King of Sweden, residing at Stockholm, in the Kingdom of Sweden, have invented new and useful Improvements in Machines for Manufacturing Plates of Boards, of which the following is a specification, reference being had to the drawings accompanying and forming a part hereof.

This invention relates to a method of and means for joining matched boards and the like and cutting the joined boards or the like into plates or pieces of a suitable size.

In joining matched boards and the like on a large scale, such as in manufacturing packing-cases, the putting together of the tongues and grooves is a time-wasting and troublesome work, especially as it must be performed with a relatively great accuracy. Moreover, the plates obtained by the joined boards must be cut into pieces of the required shape and size.

The object of this invention is to provide an organized machine adapted to automatically perform the whole work, *i. e.* the grooving and tonguing of the boards, the joining of the same, and the cutting of the plates obtained into pieces of the desired shape and size, in a continuous operation and with the greatest possible saving of labor and time.

With this object in view the invention consists in the combinations hereinafter described and pointed out in the claims.

When a board has been joined with the plate of boards before connected together, the whole plate of boards thus obtained is moved in the lateral direction of the boards. In order to allow the part of the machine which moves the plate of boards laterally to reciprocate without hindrance from the board moving between the cutters, the invention comprises the method of and means for causing the board which is being joined with the plate to move at a considerably greater rate of speed after leaving the grooving and tonguing cutters. The plate of boards, when moving laterally, passes a number of circular saws or the like by which the ends of the boards are cut as the movement takes place. When the plate of boards has successively moved through a certain distance, a part thereof is cut off in the longitudinal direction of the boards so that one or more plates of the desired size are obtained.

The invention further consists in the construction and combination of parts hereinafter set forth.

In the drawings, I have shown a machine embodying my invention.

Figure 10:
Figure 5:
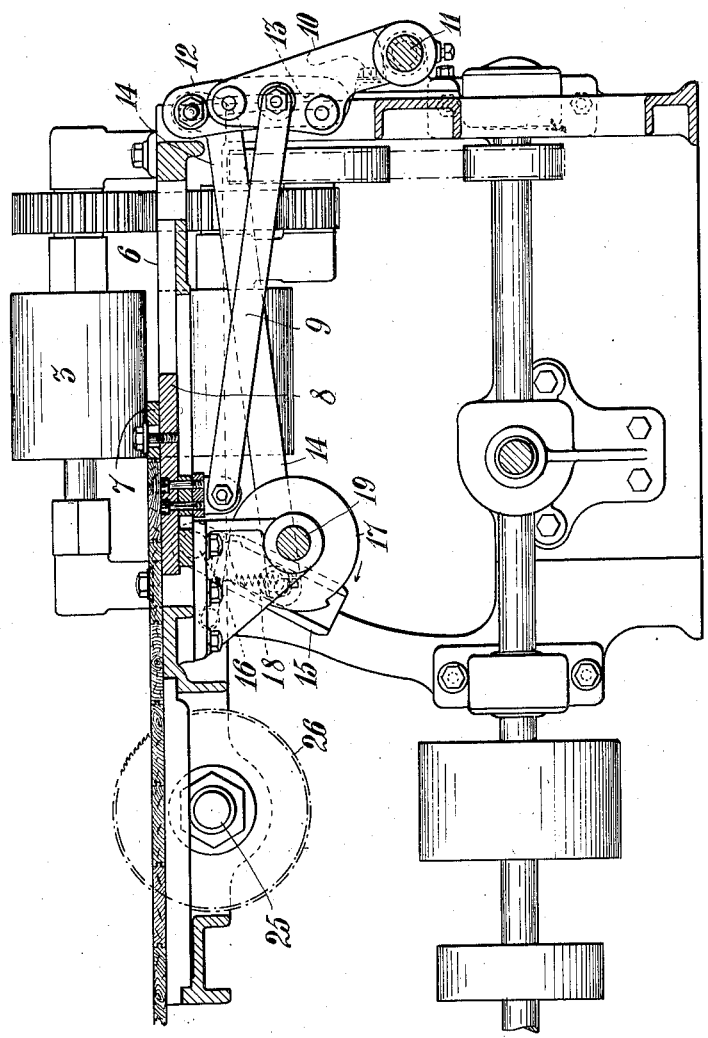

Figure 1 is a plan view of the whole machine. Fig. 2 is a side view and partial vertical section (on line A—B of Fig. 1) of the same machine. Fig. 3 is a vertical section on line C—D of Fig. 1. Fig. 4 is a front view, on an elarged scale, of the part of the machine designed to perform the joining of the boards. Fig. 5 is a side view and vertical section (on line E—F of Fig. 6) of the fore part of the board-joining mechanism. Fig. 6 is a plan view of the fore part of the said mechanism. Fig. 7 is a side view and vertical section (on line G—H of Fig. 9) of the rear part of the said mechanism. Fig. 8 is a vertical section on line I—K of Fig. 9. Fig. 9 is a plan view of the rear part of the board-joining mechanism. Fig. 10 shows a detail.

Referring to the drawings, the boards are first worked in the grooving machine 1. When the board 4 (Fig. 3) has been grooved and tongued by the cutters 2, it enters below and is engaged by a roller 3 which is driven by suitable gearing at a rate of speed which is considerably greater than that of the feed rollers of the grooving and tonguing mechanism. On account of the board 4 being thus caused to move forward at a comparatively great rate of speed, the matched side thereof engages the foregoing board 5. When the boards have been thus joined together, the whole plate of boards is moved in the lateral direction of the boards through a distance equal to the width of one board. This movement of the plate of boards is performed by the following mechanism: Placed above the table 6, at the side of the plate of boards joined, is a ruler 7 movable parallel to itself in the lateral direction of the boards. The ruler 7 is attached to slides 8 driven by connecting rods 9. The rods 9 are pivotally attached to arms 10 attached to an axle or shaft 11. Attached to the said shaft 11 is a third arm 12 having an arc-shaped slot 13, as shown in Figs. 3 and 5. Pivotally connected to the arm 12 is the one end of a rod 14 adjustable in the arc-shaped slot 13. The other end of the rod 14 is pivotally connected to an arm 15 adapted to swing about the pivot pin 16. The arm 15 is caused to swing by means of a disk 17 having a sliding roller 18 which is movable in a longitudinal slot in the arm. The disk 17 is attached to the shaft 19 which is connected to a clutch 20 (Fig. 4) working in such a manner as to make one revolution, when thrown into operative position, and thereupon automatically stop. The clutch 20 is connected by a link 21 and a lever 22 to a sliding rod 23 journaled in bearings above the table 6. Adjustably attached to the said rod is a shoulder 24 lying in the path of the board 4 moved forward by the roller 3.

The described part of the machine works as follows: During the last part of the rapid longitudinal movement of the board by which it is joined with the adjacent board it strikes the shoulder 24, by which the rod 23 is moved so as to throw the clutch 20 into operation. The shaft 19 with the disk 17 is thereby caused to make one revolution by which the arm 15 is caused to swing. The swinging movement of the rod 15 is transmitted through the rod 14 to the arm 12 and the shaft 11 and by the arms 10 and rods 9 to the slides 8 and the ruler 7 causing the latter to reciprocate transversely from the position shown in Fig. 3 toward the left and back into its original position. The ruler thus presses on the plate of boards and moves the same in the transverse direction of the boards as hereinbefore described. Since the disk 17 turns in the direction of the arrow (Fig. 5), the sliding roller 18 during the first half revolution of the disk approaches the outer end of the arm 15, i. e. the roller 18 acts on the arm 15 with an increasing torque so that the ruler 7 moves at a comparatively small speed while moving the plate of boards. During the second half revolution of the disk 17 the sliding roller 18 approaches the center of oscillation of the arm 15, i. e. the roller 18 acts on the arm with a decreasing torque by which the backward movement of the roller takes place at a comparatively great speed. By this arrangement room is immediately provided for the next board supplied. In order to regulate the length of stroke of the ruler the point of connection of the rod 14 with the arm 12 may be adjusted in the slot 13. By turning the shoulder 24 out of the path of the forward moving board 4 the clutch 20 and thereby the whole mechanism for moving the plate of boards laterally will remain inoperative so that the plate of boards will not be increased. At the same time as the plate of boards is moved, in the manner hereinbefore described, in the transverse direction of the boards, the latter are sawed at the ends and, if desired, divided into two or more parts. This is performed by circular saws 26 attached to a shaft 25. In Fig. 1 the saws are shown to be three in number, the two outer ones cutting the boards at the ends while the middle one divides the plate of boards into two parts.

The part of the machine which cuts the plate of boards longitudinally is arranged as follows: Placed above the machine frame 26' is a reciprocable frame consisting of rods 30 extending in the direction of movement of the plate of boards and cross-pieces 31 and 32 connecting the said rods 30. Projecting upwardly from the cross-piece 31 are abutments 33 (Figs. 3 and 9) for the forward moving plate of boards which will bear on the said abutments so as to cause the frame 30, 31, 32 to move correspondingly. The said frame is supported and guided by rollers 34 at the outer end and rollers 27 (Fig. 7) at the inner end. Attached to the frame 26' are four standards 36 forming a guide for a frame adapted to be raised and lowered, said frame consisting of two parallel guide bars 37 extending at right angles to the rods 30 and two cross-pieces 38 connecting the said guide bars. The cross-pieces 38 are provided with sleeves 39 adapted to move up and down on the standards 36. The guide bars 37 carry a frame 40 movable along the same. Journaled in the said frame is the shaft 41 for the circular saw 42. This saw is movable along the shaft 41 and arranged to partake in the movement of the frame 30, 31, 32. To this end the saw is attached to a sleeve 43 (Fig. 7) which is movable along the shaft 41 and connected to the same in such a manner as to partake in the revolution thereof. The sleeve is movable up and down in a vertical slot 45 in a slide 46 which is movable horizontally in a frame 47 attached to the frame 30, 31, 32 so as to move therewith. When the guide bars 37 with the frame 40 are in their lowermost positions, the saw 42 is below the upper side of the frame 26', whereas, when the bars 37 with the frame are raised into their uppermost positions, the saw projects above the plate of boards sufficiently to cut the same.

The mechanism for raising and lowering the bars 37 consists of two dies 48, 48' connected by links 49 to levers 50 attached to shafts 51. Attached to the said shafts are also arms 52 pivotally connected to links 53 pivoted to the sleeves 39. When the levers 50 are turned into a position in which the arms 52 and the links 53 are in line or nearly in line with each other, the bars 37 and the frame 40 with the circular saw will arrive into their raised positions. If, on the other hand, the arms 52 and the links 53 are turned so as to form an angle with each other, the circular saw will be lowered.

Journaled in the lower part of the frame 26' is a lever 54 (Fig. 7) connected by means of a link 55 to the frame 30, 31, 32. Pivotally attached to the lever 54 is an abutment piece 56. Placed in the path of the latter is an arm 57 attached to a bevel wheel 58 engaging a bevel wheel 59 on the shaft 60. Attached to the latter is a disk 61 having a cam-groove engaging a lever 62 connected as shown to the longitudinally movable part of a friction clutch 63. The shaft of the said clutch-part is connected by gear wheels 64 to the shaft 65. Attached to the latter is a chain-wheel 66 (Fig. 8) for the driving chain 67 which transmits movement to the chain-wheel 68. Attached to the driving chain 67 is a connecting rod 69 pivoted to the frame 40 carrying the circular saw 42. The latter is driven by belting 70 from a pulley 71 journaled in an arm 72 adapted to swing about the main shaft 73. A belt 74 transmits movement from the shaft 73 to the belt pulley 71. The transmission of movement to the circular saw 42 will thus not be influenced by the movements of the latter.

The described cutting mechanism works as follows: When the plate of boards moves the frame 30, 31, 32 forward, the lever 54 is swung about its fulcrum causing the abutment piece 56 to act on the arm 57 so as to turn the shaft 60 and thereby the disk 61 which acts to throw the clutch 63 into operation. By this means the shaft 65 with the chain-wheel 66 and the chain 67 are caused to move. Supposing the frame 40 to be in its lowered position, just in front of the die 48', which is the initial position of the frame, the latter is moved by the chain 67 against the die and moves the same outward so that the parts 52 and 53 will turn into line with each other, by which the frame with the circular saw is raised. During the continued movement of the chain the frame 40 is moved toward the left (Fig. 8), and the circular saw cuts the plate of boards longitudinally. Thereupon the frame 40 meets the die 48 and moves the same toward the left (Fig. 8) by which the parts 52 and 53 are again turned into positions in which they form an angle with each other so that the frame 40 with the circular saw is lowered. During the continued movement of the chain the frame 40 with the saw is moved back (toward the right in Fig. 8). During the last part of this backward movement a pin 75 projecting from the frame 40 strikes an arm 76 connected by a rod 77 to an arm 78 on the shaft 60. By this means the shaft 60 is turned in such a direction that the clutch is thrown out of operation so that the saw stops in its initial position.

As shown in Fig. 8, the levers 50 are connected to each other through a rod 77'. Placed on the said rod is a spring 78' bearing at one end on a shoulder 79 on the rod and at its other end on a sleeve 80 through which the rod 77' is movable. The sleeve is connected to the machine frame by links 81.

The mechanism described works as follows: When the levers 50 are swung for lowering the frame 40 and the circular saw 42, the spring 78 is compressed and takes up the shock which would else arise when the frame 40 is lowered. The spring thus compressed later on aids in raising the saw frame 40.

The part of the machine which removes the finished plate of boards is arranged as follows: Projecting between the abutments 33 are arms 82 (Figs. 7 and 9) extending from a rocking shaft 83. Extending from the same shaft is an arm 84 engaged by a rod 85 supported by two arms 86 (Fig. 8) from a rocking shaft 87. Connected to the rod 85 is further a link 88 connected at its other end to an arm 89 attached to a shaft 90. This shaft has also an arm 91 which is in the way of the pin 75 on the frame 40.

The described mechanism works as follows: When the frame 40 has been lowered in the manner hereinbefore described and moves back toward the right (Fig. 8), the pin 75 meets the arm 91 and turns the shaft 90. The arm 89 and the link 88 thereby act to raise the rod 85, and the latter causes the shaft 83 to turn. The arms 82 which project beneath the edge of the cut off plate of boards (Figs. 7 and 10) are thereby caused to swing upward and lift the plate of boards above the abutments so as to enable the same to move out of the machine. The removal of the plate of boards may be performed by hand or by the following plate of boards pushing during its successive forward movement the cut off plate of boards before it until the same leaves the machine on an inclined plane or otherwise. When the cut off plate of boards has been lifted out of engagement with the abutments 33, the latter are to be brought back into the position which they had when the cut off plate of boards first met the same. This retraction is suitably effected by a spring 95 inserted between the lever 54 and a fixed point, said spring acting to swing the lever 54 back and thereby retract the frame 30, 31, 32 as soon as the abutments 33 become free. During this backward movement the abutment piece 56 freely slides over the arm 57. The latter is provided with an arm 92 having a sliding roller 93. When the abutment piece 56 swings the arm 57 toward the right (Fig. 7) in the manner hereinbefore described, the arm 92 with the roller 93 acts to lift the abutment piece so as to throw it out of engagement with the arm 57 if the swinging movement of the lever 54 becomes greater than what corresponds to the limited outer position of the arm 57.

In case the boards are to be glued, a gluing device 94 is placed between the cutters 2 and the feed roller 3. The gluing device suitably consists of a gluing disk rotating within a glue-pot, the brushy edge of the said rotary disk rubbing over the tongued or grooved edge of the board. The rapid forward movement of the board to be joined with the foregoing board entails the advantage that any resistance to the joining operation is easily overcome without the groove and tongue being damaged. Moreover, if the boards are glued before joining the glue will have a more powerful action on account of the heat created by friction during the joining operation.

It is not necessary that the grooving and tonguing of the boards is performed immediately before the boards are joined, but the joining of the boards and the continued working of the same may be performed in the manner hereinbefore described even if the boards have been planed or grooved and tongued in a separate machine.

I claim:

1. In a machine for manufacturing plates of determinated size of matched boards in a continuous operation, the combination of grooving and tonguing means for matching the boards, feeding means for moving the matched boards longitudinally, one after the other, shifting means for moving each board laterally into position into which the matched parts are engaged by the longitudinal motion of the following board, automatically coupling means for throwing the said means into operation at intervals, cross cutting means for trimming the plate of boards, and means for cutting said plate of boards in the longitudinal direction of the boards independently of the lateral movement of the same, substantially as and for the purpose set forth.

2. In a machine for manufacturing plates of determinated size of matched boards in a continuous operation, the combination of grooving and tonguing means for matching the boards, feeding means for moving the matched boards longitudinally, one after the other, shifting means for moving each board laterally into position into which the matched parts are engaged by the longitudinal motion of the following board, automatically coupling means for throwing the said means into operation at intervals, cross-cutting means for trimming the plate of boards, means for cutting the plate of boards in the longitudinal direction of the boards independently of the lateral movement of the same, and coupling means for automatically throwing the said last mentioned cutting means into operation at intervals, substantially as and for the purpose set forth.

3. In a machine for manufacturing plates of determinated size of matched boards in a continuous operation, the combination of grooving and tonguing means for matching the boards, feeding means for continuously moving the boards to be joined longitudinally, one after the other, in the same vertical and horizontal planes, means for causing the leading board to move longitudinally at a rate of speed, greater than that of the matching motion, means for moving each board laterally into position into which the matched parts are engaged by the longitudinal motion of the following board, cross cutting means for trimming the plate of boards, and means for cutting the plate of boards obtained into pieces of determinated width.

4. In a machine for manufacturing plates of boards, the combination of cutters for grooving and tonguing the boards, means for continuously moving the boards longitudinally between the said cutters, means for moving a grooved and tongued board laterally into position to receive the matched part of the next board leaving the cutters, and means for causing the said latter board to move longitudinally into engagement with the former board at a speed which is considerably greater than the speed of the board, when moving between the cutters.

5. In a machine for manufacturing plates of determinated size of matched boards in a continuous operation, the combination of cutters for grooving and tonguing the boards, feeding means for continuously moving the matched boards longitudinally, one after the other, in the same vertical and horizontal planes, means for feeding the leading board longitudinally at a rate of speed greater than that of the matching motion, a slide placed at the side of the line of movement of the boards and adapted to move transversely to the same, and means for causing the said slide to reciprocate at intervals so as to place the board supplied thereto into position into which the matched parts are engaged by the longitudinal motion of the next board supplied, means for trimming the plate of boards, and means for cutting the plate of boards into pieces of determinated width.

6. In a machine for manufacturing plates of boards, the combination of means for feeding matched boards lengthwise, one after the other, means for feeding the leading board longitudinally at an increased speed, a slide placed at the side of the line of movement of the boards and adapted to move transversely to the same, means comprising a clutch for operating the said slide so as to place the board supplied thereto into position for receiving the matched part of the next board supplied, and a shoulder adjustably placed in the line of movement of the leading board and connected to the said clutch in such a manner as to throw the same into operation when it is moved by the board.

7. In a machine for manufacturing plates of boards, the combination of means for feeding matched boards longitudinally, one after the other, means for feeding the leading board longitudinally at an increased speed, a slide placed at the side of the line of movement of the boards and adapted to move transversely to the same, an automatic clutch adapted to be thrown into operation at intervals, a disk connected to the said clutch, a sliding roller placed on the said disk, a swingable arm having a slot engaged by the said sliding roller, and connections between the said swingable arm and the slide for imparting movement to the same at intervals so as to place the board supplied thereto into position for receiving the matched part of the next board supplied.

8. In a machine for manufacturing plates of boards, the combination of means for feeding matched boards longitudinally, one after the other, means for feeding the leading board longitudinally at an increased speed, a slide placed at the side of the line of movement of the boards and adapted to move transversely to the same, an automatic clutch adapted to be thrown into operation at intervals, a disk connected to the said clutch, a sliding roller placed on the said disk, a swingable arm having a slot engaged by the said sliding roller, a rod connected to the said arm, a swingable arm having a slot engaging the said rod, and connections between the said swingable arm and the slide for imparting movement to the same at intervals so as to place the board supplied thereto into position for receiving the matched part of the next board supplied.

9. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, and a circular saw connected to the said frame so as to partake in the movement thereof and adapted to move across the said frame for cutting the plate of boards longitudinally.

10. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed, greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a rotary shaft journaled in the said second frame, transversely to its direction of movement, a circular saw movable with the first frame along the said shaft and rotating with the same, and means for raising and lowering the said second frame for throwing the said circular saw into or out of operative position for cutting the plate of boards longitudinally.

11. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed, greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a rotary shaft journaled in the said second frame, transversely to its direction of movement, a circular saw movable with the first frame along the said shaft and rotating with the same for cutting the plate of boards longitudinally, a vertically movable frame for supporting the said second frame, shafts for supporting the said third frame, connections between the said shafts and the said third frame for raising or lowering the latter when the shafts are turned, a die placed in the line of movement of the second frame and movable in the direction of movement of the latter, and connections between the said die and the shafts for turning the latter when the die is operated by the said second frame.

12. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed, greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, a frame movable in the direction of the plate of boards, said frame having abutments for the said plate, a second frame movable transversely to the direction of movement of the first frame, a rotary shaft journaled in the said second frame, transversely to its direction of movement, a slide movable in the said first frame, in a direction which is parallel to the direction of movement of the said second frame, a sleeve movable along the said shaft and rotating with the same, said sleeve being also movable vertically in the said slide, a circular saw attached to the said sleeve, and means for raising and lowering the said second frame for throwing the said circular saw into or out of operative position for cutting the plate of boards longitudinally.

13. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed, greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a rotary shaft journaled in the said second frame, transversely to its direction of movement, a circular saw movable with the first frame along the said shaft and rotating with the same for cutting the plate of boards longitudinally, an endless chain mounted on chain-wheels, connections between the said endless chain and the second frame for transmitting movement thereto, a clutch connected to one of the said chain-wheels, a cam-grooved disk connected to the said clutch, a swingable arm connected to the said cam-grooved disk, and an abutment piece connected to the first frame in position to operate the said swingable arm and thereby the cam-grooved disk so as to throw the clutch into operation and thereby impart movement through the chain-wheels and chain to the said second frame.

14. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a rotary shaft journaled in the said second frame, transversely to its direction of movement, a circular saw movable with the first frame along the said shaft and rotating with the same for cutting the plate of boards longitudinally, means operated from the first frame, in a certain position thereof, for imparting movement to the second frame, and means for automatically stopping the said second frame when it arrives into its initial position.

15. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed greater than that of the matching motion, a slide placed at the side of the line of movement of the boards and adapted to move transversely to the same, means for causing the said slide to reciprocate at intervals so as to place the board supplied thereto into position into which the match parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a rotary shaft journaled in the said second frame, transversely to its direction of movement, a circular saw movable with the first frame along the said shaft and rotating with the same for cutting the plate of boards longitudinally, an endless chain mounted on chain-wheels, connections between the said endless chain and the second frame for transmitting movement thereto, a clutch connected to one of the said chain-wheels, a cam-grooved disk connected to the said clutch, a swingable arm connected to the said cam-grooved disk, an abutment piece connected to the first frame in position to operate the said swingable arm and thereby the cam-grooved disk so as to throw the clutch into operation and thereby impart movement through the chain-wheels and chain to the said second frame, and means comprising an arm projecting into the path of the said second frame and connected to the clutch for throwing same out of operation when the said frame arrives into its initial position.

16. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed, greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for trimming the plate of boards, means for severing a plate of boards of a desired size, and means for automatically disengaging the severed plate of boards from the machine.

17. In a machine for manufacturing plates of determinated size of matched boards in a continuous operation, the combination of cutters for grooving and tonguing the boards, feeding means for moving the matched boards longitudinally, one after the other, means for feeding the leading board longitudinally at a rate of speed, greater than that of the matching motion, a slide placed at the side of the line of movement of the boards and adapted to move transversely to the same, means for causing the said slide to reciprocate at intervals so as to place the board supplied thereto into position into which the matched parts are engaged by the longitudinal motion of the next board supplied, cross cutting means for successively trimming the boards as they are moved transversely, means for severing a plate of boards of a desired size, and means for automatically disengaging the severed plate of boards from the machine.

18. In a machine for manufacturing plates of determinated size of matched boards in a continuous operation, the combination of cutters for grooving and tonguing the boards, feeding means for moving the matched boards longitudinally, one after the other, a slide placed at the side of the line of movement of the boards and adapted to move transversely to the same, means for causing the said slide to reciprocate so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a circular saw mounted in the said second frame and movable with both frames for cutting the plate of boards longitudinally, a swingable arm placed in the path of the said second frame, swingable arms extending beneath the plate of boards, between the abutments for the same, and connections between the swingable arm operated by the said second frame and the swingable arms extending beneath the plate of boards for raising the latter and thereby raising the plate of boards so as to enable the same to leave the machine.

19. In a machine for manufacturing plates of determinated size of matched boards in a continous operation, the combination of cutters for grooving and tonguing the boards, feeding means for moving the matched boards longitudinally, one after the other, a slide placed at the side of the line of movement of the boards and adapted to move transversely to the same, means for causing the said slide to reciprocate so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a circular saw mounted in the said second frame and movable with both frames for cutting the plate of boards longitudinally, means for disengaging the plate of boards from the abutments, and means for retracting the first frame when a plate of boards has been disengaged.

20. In a machine for manufacturing plates of determinated size of matched boards in a continuous operation, the combination of cutters for grooving and tonguing the boards, feeding means for moving the matched boards longitudinally, one after the other, a slide placed at the side of the line of movement of the boards and adapted to move transversely to the same, means for causing the said slide to reciprocate so as to place the board supplied thereto into position into which the matched parts are engaged by the longitudinal motion of the next board supplied, cross cutting means for trimming the plate of boards, a frame movable in the direction of movement of the plate of boards, said frame, having abutments for the said plate, a second frame movable transversely to the direction of movement of the former, a circular saw mounted in the said second frame and movable with both frames for cutting the plate of boards longitudinally, a swingable arm placed in the path of the said second frame, swingable arms extending beneath the plate of boards, between the abutments for the same, connections between the swingable arm operated by the said second frame and the swingable arms extending beneath the plate of boards for raising the latter and thereby raising the plate of boards so as to enable the same to leave the machine, and means for retracting the first frame when a plate of boards has been disengaged.

21. In a machine for manufacturing plates of determinated size of matched boards in a continuous operation, the combination of cutters for grooving and tonguing the boards, feeding means for moving the matched boards longitudinally, one after the other, a slide placed at the side of the line of movement of the boards and adapted to move transversely to the same, means for causing the said slide to reciprocate so as to place the board supplied thereto into position into which the matched parts are engaged by the longitudinal motion of the next board supplied, cross cutting means for trimming the plate of boards, a frame movable in the direction of movement of the plate of boards, said frame having abutments for the said plate, a second frame movable transversely to the direction of movement of the former, a circular saw mounted in the said second frame and movable with both frames for cutting the plate of boards longitudinally, a swingable arm placed in the path of the said second frame, swingable arms extending beneath the plate of boards, between the abutments for the same, connections between the swingable arm operated by the said second frame and the swingable arms extending beneath the plate of boards for raising the latter and thereby raising the plate of boards so as to enable the same to leave the machine, and a spring for retracting the first frame when a plate of boards has been disengaged.

ANDERS AUGUST WESTMAN.

Witnesses:
KARL RUNCSKOG,
AUG. SÖRENSEN.